(12) United States Patent
Tate et al.

(10) Patent No.: US 7,917,828 B2
(45) Date of Patent: Mar. 29, 2011

(54) PROVIDING ERROR CORRECTION CODING FOR PROBED DATA

(75) Inventors: Larry Tate, Hopkinton, MA (US); Richard Glass, Olympia, WA (US); Sanjay Dabral, Palo Alto, CA (US); Colin Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 11/647,039

(22) Filed: Dec. 28, 2006

(65) Prior Publication Data

US 2008/0163034 A1 Jul. 3, 2008

(51) Int. Cl.
*H03M 13/00* (2006.01)
(52) U.S. Cl. .......... 714/752; 714/786
(58) Field of Classification Search .......... 714/752, 714/781, 786
See application file for complete search history.

(56) References Cited

U.S. PATENT DOCUMENTS

| | | | |
|---|---|---|---|
| 6,009,488 A | 12/1999 | Kavipurapu | 710/105 |
| 6,038,693 A * | 3/2000 | Zhang | 714/768 |
| 6,738,935 B1 * | 5/2004 | Kimmitt | 714/701 |
| 7,266,735 B2 * | 9/2007 | Hirabayashi | 714/703 |
| 7,328,377 B1 * | 2/2008 | Lewis et al. | 714/48 |
| 7,353,438 B2 * | 4/2008 | Leung et al. | 714/720 |
| 7,461,320 B2 * | 12/2008 | Klein | 714/754 |
| 7,523,364 B2 * | 4/2009 | Alves et al. | 714/710 |

OTHER PUBLICATIONS

U.S. Appl. No. 11/479,888, filed Jun. 30, 2006, entitled "Testing Microelectronic Devices Using Electro-Optic Modulator Probes," by Sanjay Dabral, et al.
U.S. Appl. No. 11/479,889, filed Jun. 30, 2006, entitled "Circuit Board-To-Circuit Board Connectors Having Electro-Optic Modulators," by Sanjay Dabral, et al.

* cited by examiner

*Primary Examiner* — Esaw T Abraham
(74) *Attorney, Agent, or Firm* — Trop, Pruner & Hu, P.C.

(57) ABSTRACT

In one embodiment, the present invention includes a method for receiving an error correction code for information from a first port of a first agent and receiving the information from a second port of the first agent by probing a first link under test that couples the first agent and a second agent. The code may be used to validate the information, e.g., in a probe receiver during test or debug operations. Other embodiments are described and claimed.

9 Claims, 7 Drawing Sheets

PROVIDING ERROR CORRECTION CODING FOR PROBED DATA

BACKGROUND

Embodiments of the present invention relate to computer systems and more particularly to methods and apparatus for testing and validating such systems.

To save on the number of pins and traces needed to support the bandwidth of ever-faster semiconductor devices such as microprocessors and so forth, the data rates on the busses that connect such devices to memory, graphics and peripherals must constantly scale to higher rates. Interactions between such devices are observed for purposes of logic validation, in order to debug the devices and ship product. For modern computer systems including their semiconductor devices and busses, validation systems/tools incorporating logic/traffic trace probes are used to debug and validate new systems and boards for shipment, and also to quickly diagnose field return issues that may be design or process related or both in order to avoid costly product recalls.

A logic probe for obtaining data should add virtually no cost to the product under test, and thus it should be attachable within the space, thermal, and other product constraints of the original product. It should be easy to set up, operate with acceptable error rates, and be able to work reliably/robustly over manufacturing variations. Point-to-point or other high-speed links have very small signaling margins, and thus a probe should not perturb the bus significantly. For example, in some systems a 15% voltage and 5% timing eye margin reduction may be the maximum allowed, and less is better. The output of the logic probe should be of acceptable recovered trace integrity (i.e., within a couple orders of magnitude as reliable as the worst case for the link itself in terms of bit error rate (BER) performance). Finally, the probe should not change either the static latency or dynamic timing of the link significantly and therefore should not introduce any significant timing delay or delay variation when inserted.

Current probing methods include direct tap resistive probes. However, direct tap probes generally do not scale to higher bandwidth present in today's systems. Thus, other methods of probing such as mirrored (i.e., duplicate) ports directly on the device, regenerative repeaters (with built-in mirrored ports) and electromagnetic coupler-based probes are being developed for future generation systems.

However, each of these alternatives suffers from drawbacks. Mirroring ports on a semiconductor device introduces unacceptable product cost adders because of the silicon area impact, and the cost and complexity of added routing and pads and pins/balls on the die and package. Inserting regenerating repeaters at the beginning or end of a channel lengthens the inter-device channel, resulting in some eye margin reduction. Such repeater probes also add appreciable latency to a link and can mask bugs or otherwise alter system behavior. Probing with interposer couplers, both mid-bus and socketed interposers, degrades overall channel performance and introduces route-ability and design challenges to fit sufficiently large/powerful electromagnetic couplers into the pin fields and bus pitches. Also, space and thermal constraints often limit the number of links that may be probed in one socket using electromagnetic couplers, resistor taps or optical modulator-based probes.

Ultimately, the purpose of a logic probe is to monitor the bus traffic to help determine the state of the device over time and to find errors inside the device by combining the state information with software simulation or hardware emulation. To reliably debug the insides of such a device, a link being probed should have an acceptably low BER, both for the link being observed and for the captured trace. Bit errors on the bus will imply false state information and complicate debug. Second, the timing of traffic on an interconnect should not be perturbed. Current testing systems suffer from drawbacks of expense in terms of real estate and also can cause perturbation on a link, and can suffer from a high BER due to the speed of the link.

DETAILED DESCRIPTION

Figure 1A:
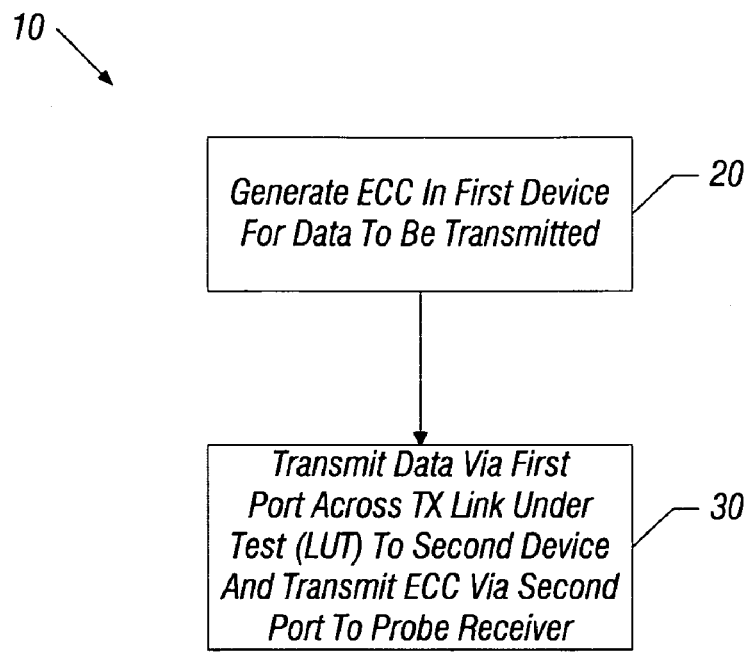
FIG. 1A is a flow diagram of a method in accordance with one embodiment of the present invention.

In various embodiments, an integrated circuit (IC) such as a processor, chipset, graphics processing unit (GPU), memory, or other such device may include, in addition to standard communication ports, one or more additional ports to be used for transmission of error correction information such as error correction coding (ECC) information, e.g., forward error correction (FEC) information associated with data transmitted on the standard ports. As used herein, the terms ECC and FEC are directed to codes that can both detect and correct an error. In contrast, an error detection code such as a parity code can detect but not correct an error.

In particular embodiments, a chip may be coupled to another chip or other system component via a high speed interconnect such as one or more serial links. Such link under test (LUT) communication channels may be unidirectional links that couple two or more components. The active components (i.e., agents) contain transceivers that transmit and receive information. In given systems, the components may also generate error detection codes for the given link. If an error is detected by such a code, a retransmit request can be generated such that the link can retransmit the data. However, a probing link cannot trigger a retransmit without perturbing the system. Thus embodiments may use ECC to improve probing link robustness, and associated transceivers and ports of components may be configured to transmit the ECC codes in synchronism with standard system information transmitted across the LUT, e.g., data packets/bits, etc.

To enable accurate testing, debugging or other analysis of the chip, probe channels may be coupled to various points in the system. Specifically, a dedicated port, which may include a limited number of pins or connectors, may be used to provide the error correction information via a first probe channel, while a standard port that is coupled to the interconnect communicates data that is associated with the error correction coding. A second probe channel may be coupled to the other direction of the chip-to-chip interconnect, also referred to herein as a LUT. The multiple probe channels may be coupled to a probe receiver which, in various embodiments may be an integrated circuit such as an applications specific integrated circuit (ASIC), circuit board, or other device to receive information from the probe channels and process the same. A probe receiver may further include circuits to align and synchronize information from an FEC port with the probe data channel so that the ECC bits correctly correspond to the data for which they were generated. This processed information may then be provided, e.g., to a logic analyzer for analysis of the information.

In this way, testing, debugging and so forth may be performed while using limited probe size/strength overhead and improving operation and enabling probing of signals that may be in a relatively degraded state, such as via a probe coupled to a far end of a LUT. That is, in various implementations a probe coupled to a receiving end of a LUT may pass data to the probe receiver. Concurrently, the data is also processed in the transmit or receiving IC in the LUT to generate error correction coding for that data which can then be passed to the probe receiver via the dedicated port and associated probe channel. Thus ECC data received and used by the probe receiver can be generated at a generator of the information, or at a receiver of the information (at the cost of additional data buffering at the probe receiver).

In different implementations, one or more components within a system may include FEC generation blocks to enable testing in accordance with an embodiment of the present invention. Referring now to FIG. 1A, shown is a flow diagram of a method in accordance with one embodiment of the present invention. As shown in FIG. 1A, method 10 may begin by generating ECC information in a first device for data to be transmitted from the device (block 20). For example, a processor may generate a FEC for data to be transmitted across a LUT. Then both the data and the FEC may be transmitted from the first device (block 30). Specifically, the data may be transmitted across a transmit (TX) LUT to a second device, e.g., a chipset, while the FEC may be transmitted along a first probe channel to a probe receiver. In various embodiments, the data and the ECC may be transmitted from separate ports of the processor (e.g., the data via a standard port and the ECC via a dedicated, minimal test or other port). Then, as will be described below the probe receiver, which may probe the TX LUT via a second probe channel for the data, may perform error detection and correction and pass the data on to, e.g., a logic analyzer. Note that ECC may be performed and used even where the communication protocol of the underlying LUT does not implement ECC.

Figure 1B:
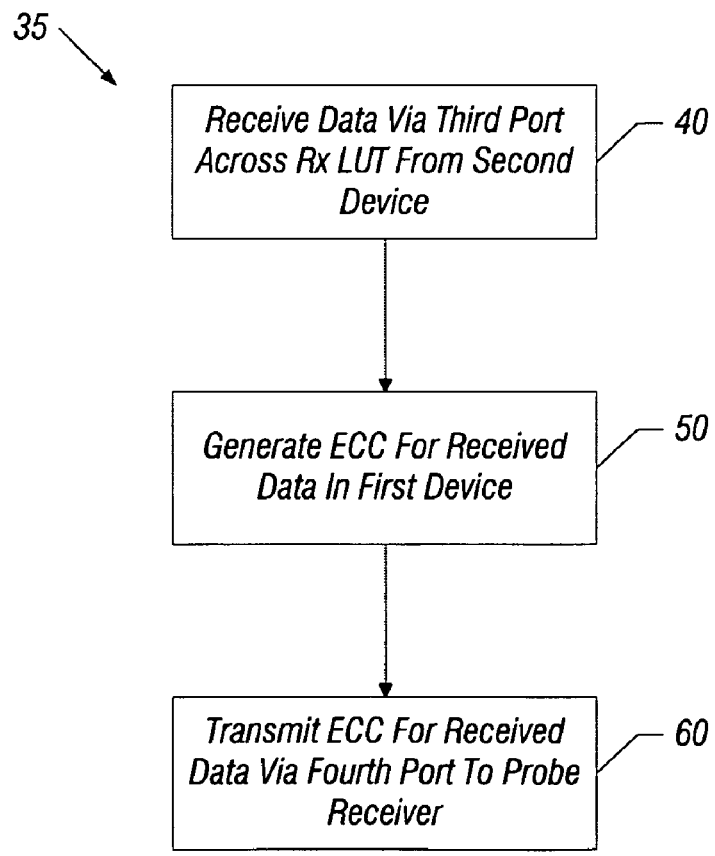
FIG. 1B is a flow diagram of a method in accordance with another embodiment of the present invention.

Now referring to FIG. 1B, shown is a flow diagram of a further method in accordance with another embodiment of the present invention. Method 35 may be used to generate an ECC for data received in an agent. That is, in some implementations a device, i.e., the processor in this example, may receive data from another component, e.g., the chipset, and perform an error detection on the data to detect any errors present in this information (and request retransmission if needed). Further, the device may generate an ECC for use by a probe receiver. Thus as shown in FIG. 1B, method 35 may begin at block 40 where the data may be received at the processor via a third port from a second device across a receive (RX) LUT (and error detection and generation of a retransmit request may be performed, if an error is detected). Further, the processor may generate an ECC for the received data (block 50). Finally, the first device may then transmit this ECC data, e.g., via another specialized (e.g., a second test port) to the probe receiver (block 60). While shown with this particular implementation in the embodiment of FIGS. 1A and 1B, the scope of the present invention is not limited in this regard. For example, instead of the unidirectional links described, methods in accordance with an embodiment of the present invention may be performed using bidirectional links.

Figure 2:
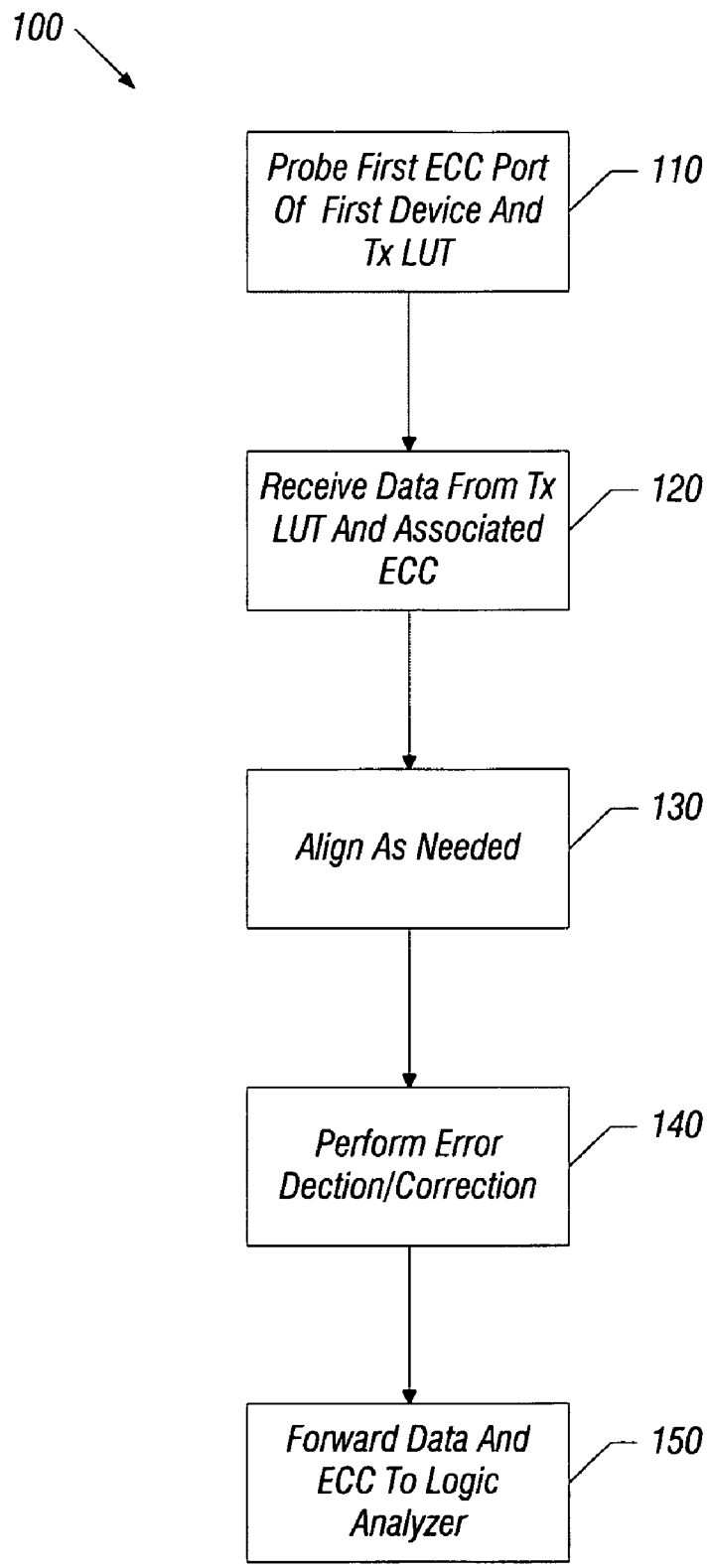
FIG. 2 is a flow diagram of a method of handling information obtained in a probe receiver in accordance with an embodiment of the present invention.

In various implementations, a probe receiver may receive information from various sources such as different LUTs, different devices of a system and so forth. Referring now to FIG. 2, shown is a flow diagram of a method of handling such information in a probe receiver in accordance with an embodiment of the present invention. As shown in FIG. 2, method 100 may begin by probing a first ECC port of a first device and a TX LUT (block 110). For example, probe heads may be coupled to the first ECC port and to the TX LUT at the transmitting end of the first device which, as discussed above, may correspond to a processor or other such integrated circuit. The probe information may be received in a probe receiver (block 120). Because of timing differentials between ECC generation and transmission from the ECC port and transmission of the data via a standard port, the probe receiver may then align the ECC with the associated data as needed (block 130). Then, the probe receiver may perform error detection/correction (block 140). For example, based on the ECC it may be determined whether an error is present and, if so, the error can be corrected. Furthermore, additional error detection, e.g., via a standard error detection mechanism of the LUT such as a cyclic redundancy checksum (CRC) operation may also be performed by the probe receiver to confirm that no other errors exist. If the data is determined to be correctly received, the data and optionally the ECC may be forwarded to a logic analyzer (block 150), where there the data may be analyzed as desired for given debug, testing or other operations. Thus the ECC may be used twice, and may be used to recover from errors occurring during transmission to the logic analyzer, which may be at a distance of 30 meters or more from the probe receiver.

Figure 3:
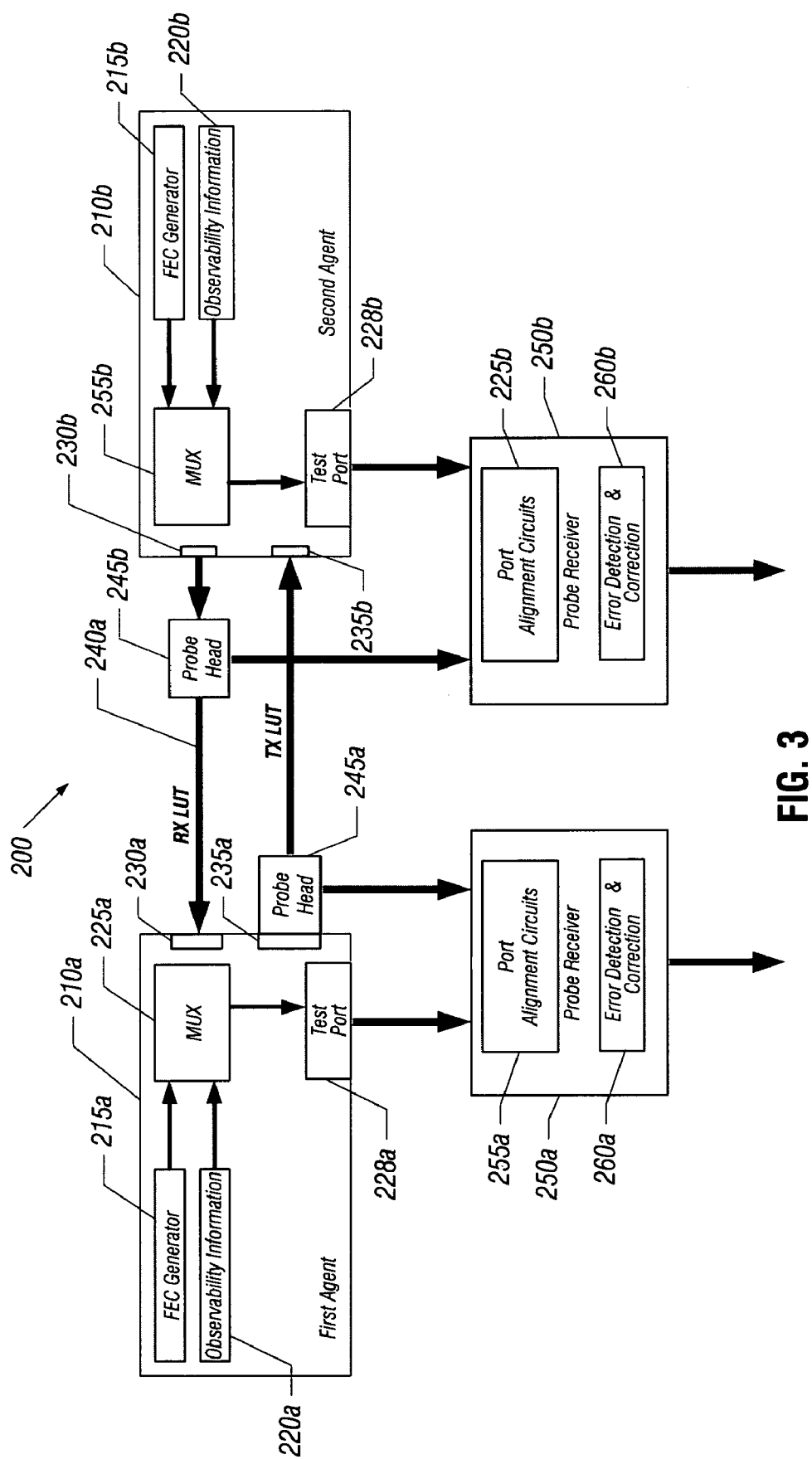
FIG. 3 is a block diagram of a portion of a system in accordance with one embodiment of the present invention.

Referring now to FIG. 3, shown is a block diagram of a portion of a system in accordance with one embodiment of the present invention. As shown in FIG. 3, system 200 includes multiple agents, namely a first agent 210a and a second agent 210b (generically agent 210). In the embodiment of FIG. 3, first agent 210a may be a processor such as a central processing unit (CPU), while second agent 210b may be a chipset, although the scope of the present invention is not limited in this regard. For ease of the illustration first agent 210a will be discussed further, however it is to be understood that similar components designated with the same numeral and a different subscript (i.e., a "b" subscript) may be present in second agent 210b.

As shown in FIG. 3, first agent 210a may include a FEC generator 215a to generate error correction codes, namely FEC values for data to be output from first agent 210a. The FEC values may be computed using, for example, Hamming, BCH, Gold, Walsh, convolutional codes, or so forth. This information may be provided to a multiplexer 225a which is further coupled to receive observability information 220a. Multiplexer 225a may be used to stream out observability information and/or the FEC data from agent 210a. Such observability information may correspond to, for example, processor state information, e.g., derived from on-chip design for test (DFT) circuitry. Control of multiplexer 225a may be selected using either internal register bits or via a dedicated control pin as part of a test port 228a.

During normal operation, FEC generator 215a may be disabled. However, for testing, debug or other such operation, FEC generator 215a may be enabled to provide data to multiplexer 225a, which may select such information for output via port 228a. Port 228a may be a separate dedicated port. This separate port may be of relatively minimal size, e.g., in silicon area, number of pins and so forth. In some embodiments, pins of port 228a can be multiplexed with a small-width parallel port than can enable fairly high bandwidth to stream out internal state information useful in debug, as well as streaming out information useful for keeping the validation system in synchronization. Pins of port 228a may in some cases be shared with chip functions not needed during validation. In one embodiment, an additional pin, for example, could be used to indicate whether the mode of such multiplexed pins are in FEC or parallel port mode. In contrast to this relatively small port, additional ports may be present within first agent 210a, including, for example, ports 230a and 235a, each of which may be coupled to a respective LUT, namely a RX LUT 240a and a TX LUT 240b (generically LUT 240). In various embodiments, LUTs 240 may be of a serial-based point-to-point interconnect protocol such as a common system interface (CSI), a Peripheral Component Interconnect (PCI) Express™ (PCIe™) link based on the PCI Express™ Specification Base Specification version 1.1 (published Mar. 28, 2005), or other such link. Ports 230a and 235a may be much larger than port 228a in size in silicon area, as well as number of interconnects or pins associated therewith, as these ports may be used for transmission of data during all manners of operation. Note that port 228a may be placed/floor-planned separately from ports 230a and 235 or may be grouped with them. Also, port 228a may be implemented as a package top-side port to cable or otherwise connect to a probe receiver 250a or it may connect to circuit boards or the like using package pins, and interposed or otherwise connected to probe receiver 250a. Similar components to those with regard to first agent 210a may be present in second agent 210b.

To enable testing, probe heads 245a and 245b may be coupled to LUTs 240. As described above, such probe heads may be of many different types such as direct tap, electromagnetic coupling (EMC), optical or other probes to sense signals and send them to probe receivers 250a and 250b (generically probe receiver 250) using probe channels that may be implemented using printed circuit board (PCB), flex cables, micro-coaxial cables or other ways. To confirm the accuracy of probed data and correct any errors that may be present, both probe heads 245a and 245b, along with ports 228a and 228b may be coupled to probe receivers 250a and 250b. Such probe receivers which may be an ASIC, circuit board or other logic, may include circuitry to receive the information from these sources and perform alignment operations, as well as error detection/correction. In various embodiments, probe receiver 250 may implement a full link layer such as that of the communication protocol of LUT 240. In some embodiments, probe receiver 250a transmits the recovered data to a logic analyzer (LA) or other validation device. In other embodiments, the trace buffer LA function may be implemented in the probe receiver IC.

Specifically, probe receiver 250a includes a port/alignment circuit 255a to receive both FEC information and associated data from TX LUT 240b. Circuit 255a may perform alignment operations to ensure that a given FEC is associated with the data that was used to generate the FEC. Probe receiver 250a may thus synchronize/deskew the received FEC information with the LUT traffic. When aligned, the FEC and the data may be passed to an error detection and correction circuit 260a to perform error detection and correction to recover single or multiple lane errors and to correct them in real time or to flag them for correction by a logic analyzer in software if a separate channel for the correction information is implemented. The resulting data, and optionally the FEC may be forwarded out of probe receiver 250a to a logic analyzer or other location. Similar circuitry and functionality is present in probe receiver 250b via port/alignment circuit 255b and error detection and correction circuit 260b.

While a system such as system 200 of FIG. 3 may improve greatly on bit error rates associated with probed information and may enable vastly reduced amounts of real estate within system agents, other implementations may seek to provide circuitry to enable ECC operations to be performed in one device for both data to be transmitted therefrom as well as data received thereby. In this way, the need for probing either in a mid-channel location or very close to a transmitting device can be avoided. Instead, probes may be located at a far end with respect to a transmitting device and probed data that is recovered can be error corrected to significantly improve the BER to an acceptable level.

Figure 4:
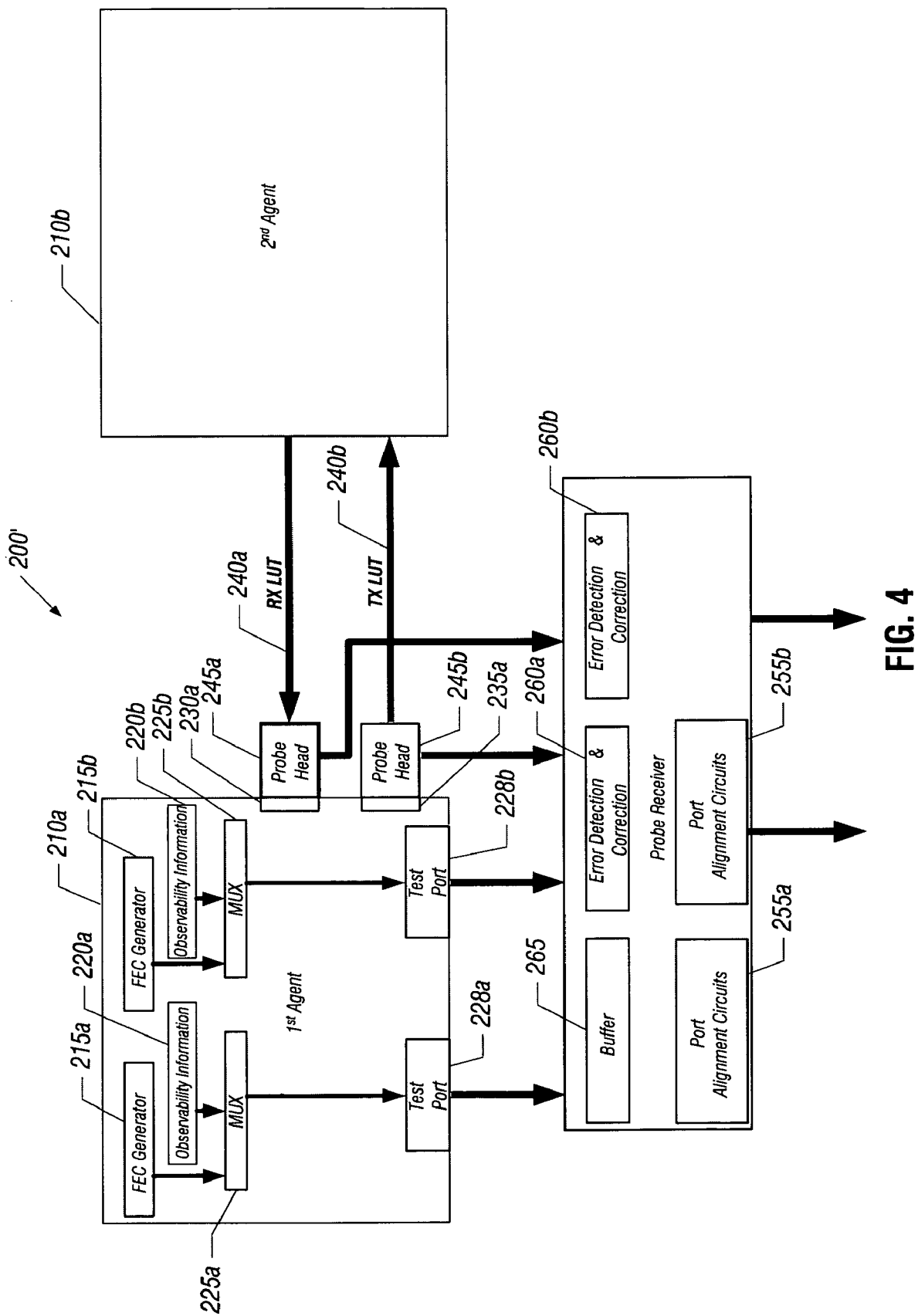
FIG. 4 is a block diagram of a portion of a system in accordance with another embodiment of the present invention.

Referring now to FIG. 4, shown is a block diagram of a system in accordance with another embodiment of the present invention. As shown in FIG. 4, system 200' is arranged similarly to that of FIG. 3 and thus similar reference numerals refer to the same components. However, note that second agent 210b does not include any FEC circuitry or ports and probe heads 245a and 245b are both closely coupled to first agent 210a. Thus, the need for a probe head either in a mid-channel location or closely coupled to second agent 210b can be avoided. The embodiment of FIG. 4 shows ECC implemented entirely on one side of the TX/RX LUTs 240, as may be the case for a personal computer (PC) configuration using a socketed interposer probe insertion mechanism. Accordingly, first agent 210a may include multiple FEC generators, multiplexers and FEC ports (i.e., FEC generators 215a and 215b, observability information 220a and 220b, multiplexers 225a and 225b and test ports 228a and 228b). For the configuration of FIG. 4, the error correction bits of RX LUT 240 may be generated once the RX receivers and link mechanism of first agent 210a fully recover the data. This implies several cycles of latency and thus the associated data may be buffered in probe receiver 250 for the TX and RX data, and also the TX FEC bits.

Thus, instead of multiple probe receivers, a single probe receiver 250 may be present that may include multiple port/alignment circuits and error detection and correction circuits (namely port/alignment circuits 255a and 255b and error detection and correction circuits 260a and 260b). Alternately, the probe receiver could be partitioned into two or more ICs. Furthermore, probe receiver 250 includes a buffer 265. Buffer 265 may be used to temporarily store data received until associated FEC information is also received. The RX data at probe receiver 250 may be delayed by a precisely matched amount to achieve alignment before sending to an associated logic analyzer. Furthermore, buffer 265 may also store temporarily, transmit data obtained from TX LUT 240b until associated received data is received across RX LUT 240b for the purpose of aligning TX and RX data.

In yet other implementations, a single FEC generator and associated circuitry may be provided in first agent 210. This circuitry may be used to provide a single ECC for both outgoing and incoming data. A single FEC covering both the TX and RX is significantly smaller than the sum of separate TX and RX FECs. This may result in significant silicon cost savings while only reducing probe BER performance slightly. Alternatively, multi-bit error correction codes, such as Reed Solomon, can be amortized over multiple links this way for improved BER.

Figure 5:
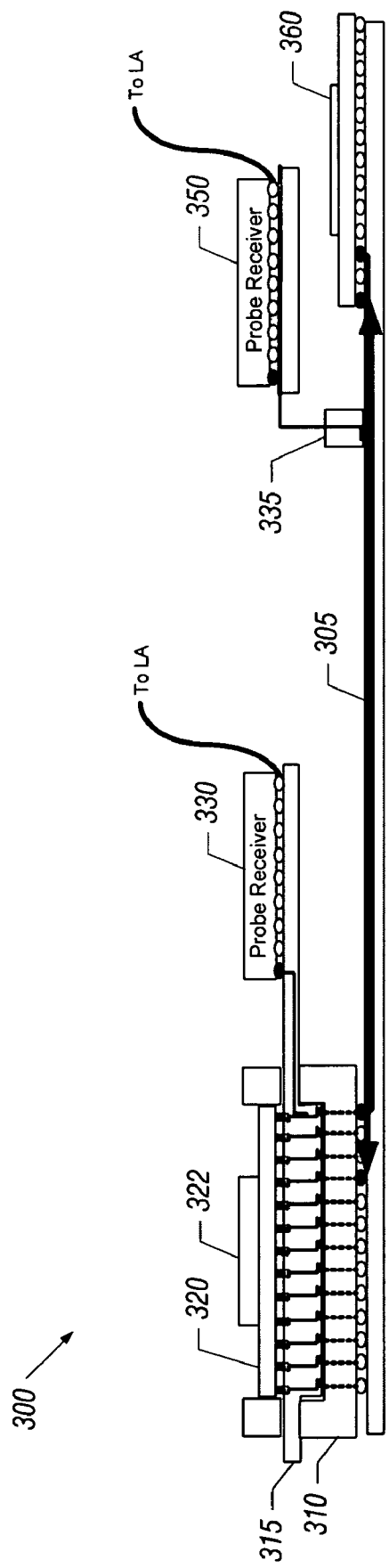
FIG. 5 is a cross-section diagram showing interposer socket-based and mid-bus slot interposer probing in accordance with an embodiment of the present invention.

Other embodiments may realize yet other methodologies to probe devices in a given system. Referring now to FIG. 5, shown is a cross-section diagram showing interposer socket-based probing in accordance with an embodiment of the present invention. As shown in FIG. 5, in system 300 a socket interposer 315 is coupled between a socket 310 coupled to a motherboard 305 and a processor package 320 including a processor 322. Using socket interposer 315, data signals, as well as FEC information may be provided to a probe receiver 330 also coupled to socket interposer 315. In turn, processed information (i.e., error corrected information) may be provided from probe receiver 330 to a corresponding logic analyzer. Similarly, a mid-bus connector 335 may also be present that in turn may be coupled to another probe receiver 350. Note that two different probe points may be present, such as one socket interposer and another mid-bus, one for each of the two sides of a LUT formed by unidirectional links. Probe receiver 350 may be used to probe signals originating from a second agent 360 also coupled to motherboard 305.

While such an implementation may provide good performance, insertion of a mid-bus connector can affect operation, particularly at high speeds due to routing to connector 335 as well as for other reasons. Furthermore, even though one or more minimal ports present in processor 322 to provide ECC data in accordance with an embodiment of the present invention consumes a minimal amount of silicon space, it can consume some small number of the limited amount of pins or other available interconnections. Accordingly, in some implementations top of chip package connections may be provided for purposes of validation, testing and so forth. Such top of chip connections may be easily accessed during testing and then for production devices, these top of chip connections need not be accessed whatsoever. Accordingly, consumption of the conventional pins, balls or other interconnects, e.g., on the underside of processor 322 for FEC in accordance with embodiments of the present invention can be avoided.

Figure 6:
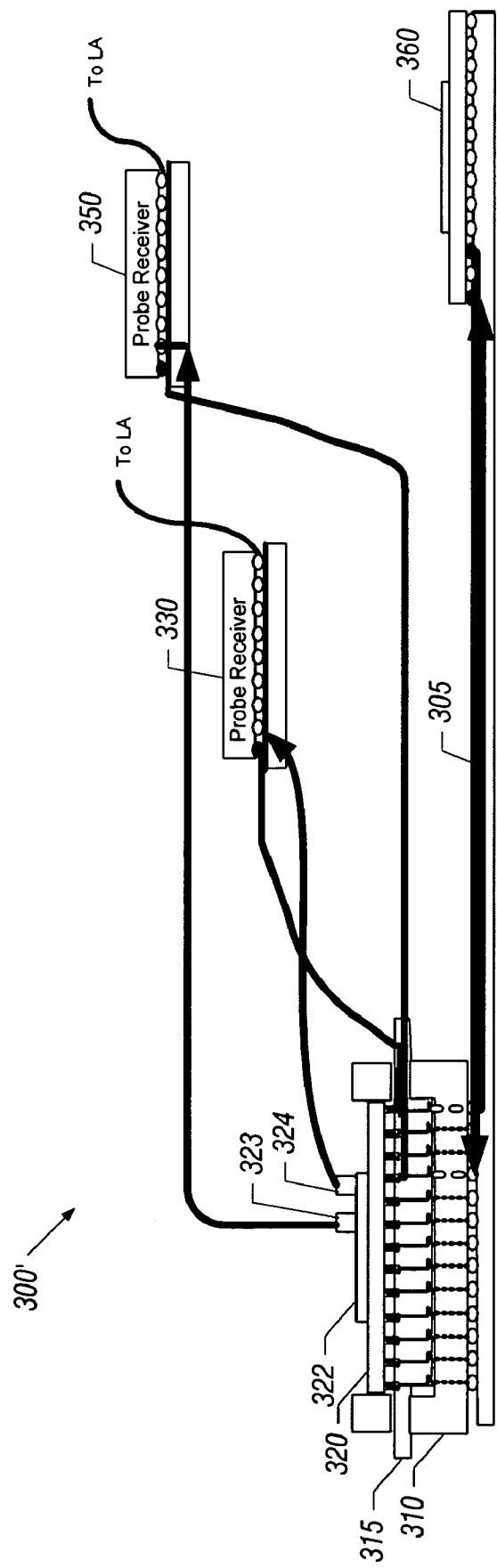
FIG. 6 is a cross-section diagram showing interposer socket-based probing in accordance with another embodiment of the present invention.

Referring now to FIG. 6, shown is a cross-section diagram showing interposer socket-based probing in accordance with another embodiment of the present invention. Note however in system 300' of FIG. 6, CPU 322 includes multiple top of chip connections 323 and 324 using multi-chip module (MCM) package technology. Such connections may be coupled to probe receivers 330 and 350. In this way, no socket connections, e.g., pins, balls or so forth need to be dedicated for minimal test ports.

Furthermore, in the embodiment of FIG. 6 the mid-bus connector that is present in FIG. 5 may be done away with, as in the embodiment of FIG. 6 socket interposer 315 may include a connection to enable coupling of data received from second agent 360 to probe receiver 350. Owing to the length of the distance from second agent 360, processor 322 may perform FEC operations on the incoming data therefrom and provide this information out to probe receiver 350 for error detection/correction in accordance with an embodiment of the present invention. In yet other implementations, a single probe receiver may be present, rather than the two probe receivers shown in FIG. 6.

With ECC in accordance with an embodiment of the present invention, it is possible to probe from both ends of even longer channels and also to simultaneously make the channels to the probe long enough to avoid any form factor impacts to the system. In this way, reduced probe size and power in the tightly constrained vicinity of processors can be realized. In various embodiments, complexity/area/pins/bumps/cost compared with an on-chip full link copy mirrored port may be reduced by a factor of four or more. In one embodiment, 20 lanes of serial data may be associated with a 5-bit Hamming code to correct single bit errors. For a TX/RX of 40 lanes, a 6-bit Hamming code can correct one error on one of the links or 10 bits could correct one error independently on both links. Such a minimal amount of error correction coding (e.g., 10 bits) is a small fraction (e.g., $^{10}\!/\!_{42}$) of a mirror port size. Further, embodiments may be more easily be placed in otherwise unused space on an agent, resulting in effectively zero cost to a product.

Various embodiments may improve probe BER by almost a square function when errors are uncorrelated: 1e-16 becomes approximately 3.8e-30. That is, assuming single bit errors dominate link BER, with 20 links each having a BER of 1e-16, the probability of 1 BE may be 20 times the BER or 2e-15, and the probability of 2 BE (i.e., the probability of BE on any one lane) and the probability of BE on any remaining lane equals (2e-15) and (19e-16), or 3.8e-30. If a single bit error is corrected with a Hamming code, then the BER corresponds to the probability of 2 BE (bit errors). Once one corrects the single bit error, standard error detection coding, e.g., CRC bits of a given protocol, may be used to determine if more than two BE's occurred on the link. In this way, probe fidelity may be improved which ultimately improves time to market of a chip undergoing debug. For cases where single bit errors are not dominant, FEC codes that correct multiple errors can be employed such as Reed-Solomon encoding.

FEC for multiple links can achieve further compression/performance tradeoffs. For example, TX bits for multiple lanes or ports using the same signaling may be compressed by computing one FEC across these ports. If TX/RX have asymmetrical performance (e.g., the TX probe channel has better BER performance than the RX probe channel when the probes are placed in close proximity to the TX port), then multiple TX links or ports, 4 for example, could share a single FEC while the RX links or ports, 4 in this case, could have an individual FEC. In some implementations, a 7-bit Hamming FEC could detect and correct a single error on a combined TX port up to 120 bits wide ($d+p+1<=2^p$, where d is data and p is parity bits for Hamming), while 20 bits could individually correct 4 RX ports up to 32 bits wide each. A forwarded clock may be amortized across the FEC codes for bits independent of their respective port affiliations.

BER improvements enabled by embodiments of the present invention can be used to resolve smaller signals. As a result probe receivers may be moved out of the constrained processor vicinity well to simplify the probe mechanical/thermal design. Furthermore, probing at a LUT receiver end of long channels that would otherwise suffer low signal amplitude induced bit errors can be performed. Further, direct resistor tap technology can be used at higher frequencies, as well as improved performance of optical, resistor and EMC probes.

Thus embodiments can provide for an improved BER performance logic probe solution with greatly improved application flexibility in terms of placement on the channel and egress to a logic analyzer. Embodiments can be applied to electromagnetically coupled logic probes, to direct probes and to optical coupler or modulator probes. Embodiments can be applied to CSI, PCI-E, fully buffered DIMM (FBD), double data rate (DDR3) and other high-data rate bus/link probing applications. The advantages of improved logic probe reliability and performance at increased monitored link rates include quicker debug of product to allow introduction of product to market quicker, as well as quicker debug of field returns of bug reports to ensure that bugs can be isolated and software, testing, processing or other workarounds can be identified in time to prevent costly returns and recalls.

Figure 7:
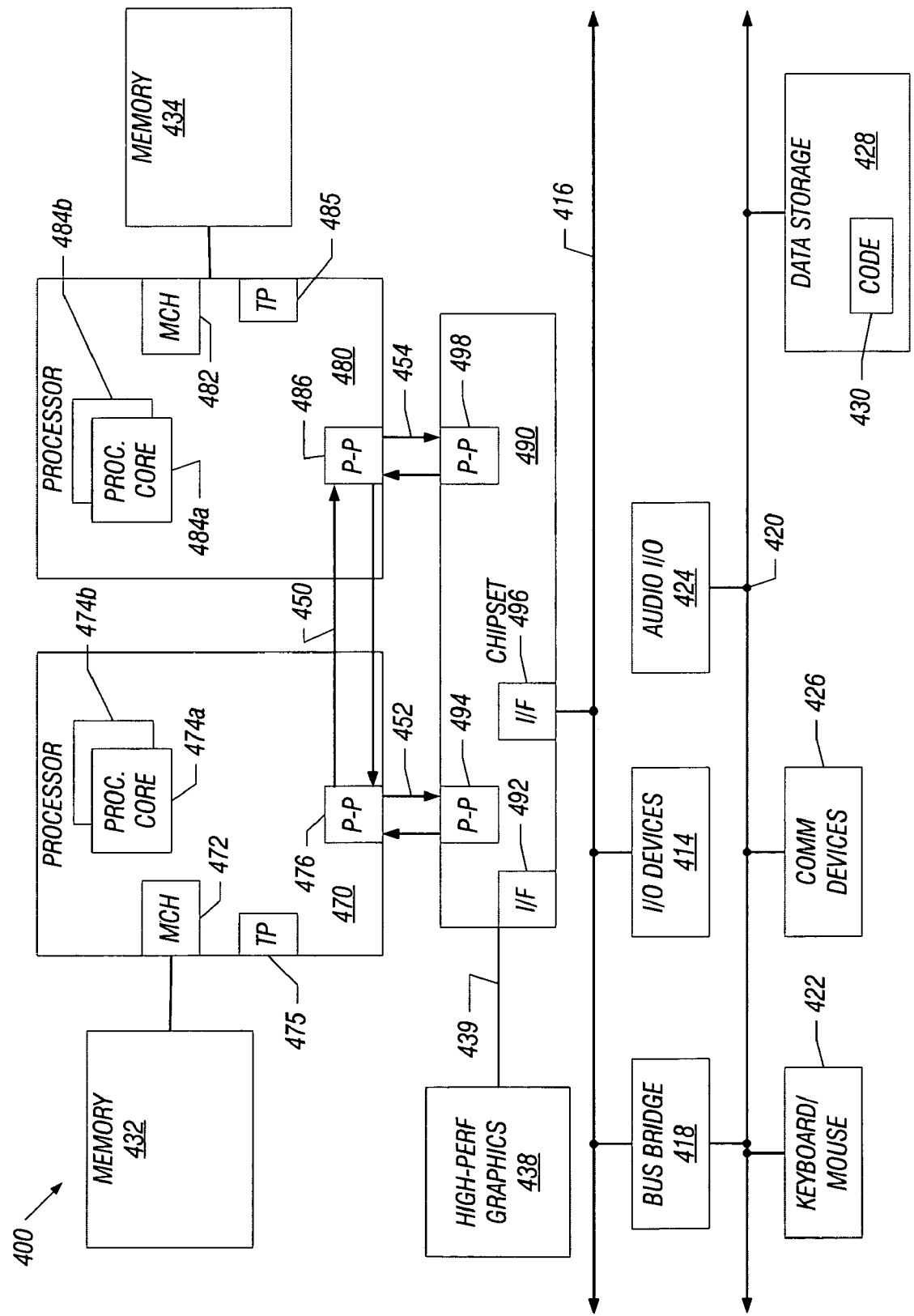
FIG. 7 is a block diagram of a system in accordance with an embodiment of the present invention.

Embodiments may be implemented in many different system types. Referring now to FIG. 7, shown is a block diagram of a multiprocessor system in accordance with an embodiment of the present invention. As shown in FIG. 7, multiprocessor system 400 uses a point-to-point interconnect system. A first processor 470 and a second processor 480 are coupled via a point-to-point interconnect port 450. As shown in FIG. 7, each of processors 470 and 480 may be multicore processors, including first and second processor cores (i.e., processor cores 474a and 474b and processor cores 484a and 484b). First processor 470 includes a test port 475 and second processor 480 includes a test port 485. Such test ports may be minimal interfaces to enable communication of ECC information along a probe channel coupled to the processor in accordance with an embodiment of the present invention. First processor 470 further includes a memory controller hub (MCH) 472 and a point-to-point (P-P) interface 476. Similarly, second processor 480 includes a MCH 482 and a P-P interface 486. As shown in FIG. 7, MCH's 472 and 482 couple the processors to respective memories, namely a memory 432 and a memory 434. Note that FEC ports could also be placed on components 438, 432, 434, etc.

A physical layer contains ports to connect processors 470 and 480 to an external chip, e.g., a chipset 490, and a routing layer routes processor packets to targets through the physical ports. First processor 470 and second processor 480 may be coupled to chipset 490 via P-P interconnect ports 452 and 454, respectively. As shown in FIG. 7, chipset 490 includes P-P interfaces 494 and 498. Furthermore, chipset 490 includes an interface 492 to couple chipset 490 with a high performance graphics engine 438. In one embodiment, a point-to-point interconnect 439 may couple these components. In turn, chipset 490 may be coupled to a first bus 416 via an interface 496.

As shown in FIG. 7, various input/output (I/O) devices 414 may be coupled to first bus 416, along with a bus bridge 418, which couples first bus 416 to a second bus 420. Second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 7, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a functional unit to perform operations on data;
    a first port to transmit first data along a first interconnect coupled to the first port;
    a second port to transmit an error correction code (ECC) for the first data along a probe channel coupled to the second port;
    an ECC generator to generate a single ECC for the first data, the first data to be transmitted on a plurality of lanes of the first interconnect; and
    a multiplexer coupled to the ECC generator and a logic block of the apparatus, wherein the multiplexer is to select the ECC or state information of the logic block for output on the second port.

2. The apparatus of claim 1, wherein the first data is to be transmitted along the first interconnect according to a communication protocol that does not provide for error correction coding.

3. The apparatus of claim 1, wherein the second port is to be coupled to the probe channel via a top of chip package connection.

4. The apparatus of claim 1, wherein the second port is to be enabled during test or debug operation of the apparatus and is to be disabled during normal operation of the apparatus.

5. A system comprising:
    a motherboard having a first link to couple a first agent with a second agent;
    the first agent including:
        a first port to transmit first data along the first link; and
        a second port to transmit an error correction code (ECC) for the first data along a probe channel coupled to the second port; and
    a probe receiver coupled to receive the first data from the first link and the ECC via the probe channel, and comprising:
        a third port to receive the first data from the first link;
        a fourth port to receive the ECC from the probe channel; and
        an error handler coupled to the third port and the fourth port to determine and correct an error in the first data based on the ECC.

6. The system of claim 5, further comprising an aligner coupled between the third and fourth ports and the error handler to align the first data with the ECC.

7. The system of claim 5, wherein the first link is to communicate according to a communication protocol that does not provide for error correction coding.

8. The system of claim 5, further comprising a second link to couple the first agent with the second agent, wherein the probe receiver is to receive second data from the second agent via a second probe channel coupled to the first agent end of the second link.

9. The system of claim 5, wherein the probe channel is coupled to the second port of the first agent via a top of chip connection.

* * * * *